United States Patent [19]

Kasai

[11] Patent Number: 4,599,767

[45] Date of Patent: Jul. 15, 1986

[54] SWIVEL SNAP HOOK OF SYNTHETIC RESIN AND METHOD OF MANUFACTURING THE SAME

[75] Inventor: Kazumi Kasai, Namerikawa, Japan

[73] Assignee: Nippon Notion Kogyo Co., Ltd., Tokyo, Japan

[21] Appl. No.: 720,724

[22] Filed: Apr. 8, 1985

[30] Foreign Application Priority Data

Apr. 10, 1984 [JP] Japan ................................. 59-71401

[51] Int. Cl.[4] ....................... A44B 13/02; F16G 17/00
[52] U.S. Cl. .......................................... 24/236; 24/237
[58] Field of Search .......................... 24/236, 237, 537

[56] References Cited

U.S. PATENT DOCUMENTS

| | | | |
|---|---|---|---|
| 548,694 | 10/1895 | Breul | 24/237 |
| 1,059,117 | 4/1913 | Chittenden | 24/236 |
| 1,059,812 | 4/1913 | Barry | 24/236 |
| 1,662,940 | 3/1928 | Sievern | 24/236 |
| 1,744,344 | 1/1930 | Sullivan | 24/236 |
| 1,764,813 | 6/1930 | Thornley | 24/236 |
| 2,198,092 | 4/1940 | Schor et al. | 24/236 |
| 2,595,700 | 5/1952 | Plough | 24/236 |
| 3,268,967 | 8/1966 | Jordan | 24/236 |
| 4,064,604 | 12/1977 | Hartman | 24/237 |
| 4,149,369 | 4/1979 | Smetz | 24/236 |

FOREIGN PATENT DOCUMENTS

128826  1/1982  Japan .

*Primary Examiner*—Victor N. Sakran
*Attorney, Agent, or Firm*—Hill, Van Santen, Steadman & Simpson

[57] ABSTRACT

A swivel snap hook molded of synthetic resin comprising only two pieces, i.e. an eye member and a hook member, which are connected to each other for pivotal movements. One of the eye and hook members has an integral bearing portion divided into a pair of opposed bearing halves by a space, the two bearing halves having a pair of aligned through-holes communicating with the space. The other member has an integral arm portion extending into the space and terminating in an enlarged end which is loosely received in the through-holes in the bearing halves across the space for rocking movements. In production, the eye and hook members are molded simultaneously molded in only one step of molding operation in coupled state.

4 Claims, 17 Drawing Figures

SWIVEL SNAP HOOK OF SYNTHETIC RESIN AND METHOD OF MANUFACTURING THE SAME

BACKGROUND OF THE INVENTION

1. Field of the Invention

The present invention relates to a swivel snap hook made of synthetic resin for use on a carrying strap of a bag, for example.

2. Prior Art

There are now on the market various swivel snap hooks of synthetic resin for use on a carrying strap of a bag such as a shoulder bag. The prior hooks generally comprise an eye member adapted to be attached to one end of the strap, and a hook member rotatably or rockably connected to the eye member with a separate retaining member or members. Thus the known hook is composed of three or more parts and hence needs to be assembled in an increased member of steps, causing only a limited rate of production and resluting in expensive products.

To this end, a two-piece swivel hook of synthetic resin has been proposed by Japanese Patent Laid-Open Publication (Kokai) No. 58-128826 in which an eye part and a hook part are pivotally movably connected to each other with no additional part. This connection is such that an axle portion of the eye part extends through a downwardly facing recess in a joint portion of the hook part from which portion a hook body and a resiliently deformable closure tongue extend divergently. However, the known hook is disadvantageous in that the eye and hook parts need to be coupled together after these two parts have been molded independently of each other.

SUMMARY OF THE INVENTION

According to the present invention, a swivel snap hook is composed of only two pieces, i.e. an eye member and a hook member, which are connected to each other for pivotal movements. One of the eye and hook members has an integral bearing portion divided into a pair of opposed halves by a space, these two bearing halves having a pair of aligned through-holes communicating with the space. The other member has an integral arm portion extending into the space and terminating in an enlarged end which is loosely received in the through-holes in the bearing halves for rocking movements. In production, the eye and hook members are molded simultaneously in only one molding step in a coupled or assembled state.

It is therefore an object of the present invention to provide a swivel snap hook of synthetic resin which is composed of only two pieces and which can be manufactured easily with minimum cost.

Another object of the invention is to provide a method of manufacturing a swivel snap hook of synthetic resin in which both pieces of the hook can be molded simultaneously in only one molding step in a coupled or assembled state.

Many other advantages, features and additional objects of the present invention will become manifest to those versed in the art upon making reference to the detailed description and the accompanying drawings in which certain preferred embodiments incorporating the principles of the present invention are shown by way of illustrative example.

DETAILED DESCRIPTION

FIGS. 1 through 4 shows a swivel snap hook which generally comprises an eye member 1 adapted to be attached to one end of a carrying strap (not shown) of a bag such as a shoulder bag, and a hook member 2 rotatably and rockably connected to the eye member 1. The eye and hook members 1, 2 are molded of synthetic resin in a manner described below.

The eye member 1 has an integral bearing portion which extends outwardly and downwardly therefrom and which is divided into a pair of opposed bearing halves 10, 10 by a space 11. The pair of opposed bearing halves 10, 10 have a pair of aligned through-holes 12, 12 of circular cross section communicating with the space 11.

The hook member 2 has a base 3, a hook body 4 extending downwardly from a lower side of the base 3, and a closure tongue 5 extending downwardly from the lower side of the base 3 so as to normally close the hook body 4. The closure tongue 5 is resiliently deformable to open the hook body 4. The hook member 2 also has an integral arm portion 13 extending upwardly from the base 3 remotely from the hook body 4 and the closure tongue 5 into the space 11 and terminating in an enlarged end 14 loosely received in the through-holes 12, 12 in the bearing halves 10, 10 across the space 11.

The arm portion 13 has a circular cross section of a diameter slightly smaller than the width of the space 11 (FIGS. 1 and 4), while the enlarged end 14 of the arm portion 13 is in the shape of a sphere having a diameter larger than the width of the space 11 and substantially equal to the diameter of the through-holes 12, 12. Thus the hook member 2 is rotatable and rockable on the eye member 1 and vice versa. Specifically, the hook member 2 is rotatable on the eye member 1 about the axis of the arm portion 13 and is pivotally movable on the eye member 1 about the enlarged end 14 in a plane which includes the axis 6 of the bearing portion and which is parallel to the bearing halves 10, 10.

Figure 5:
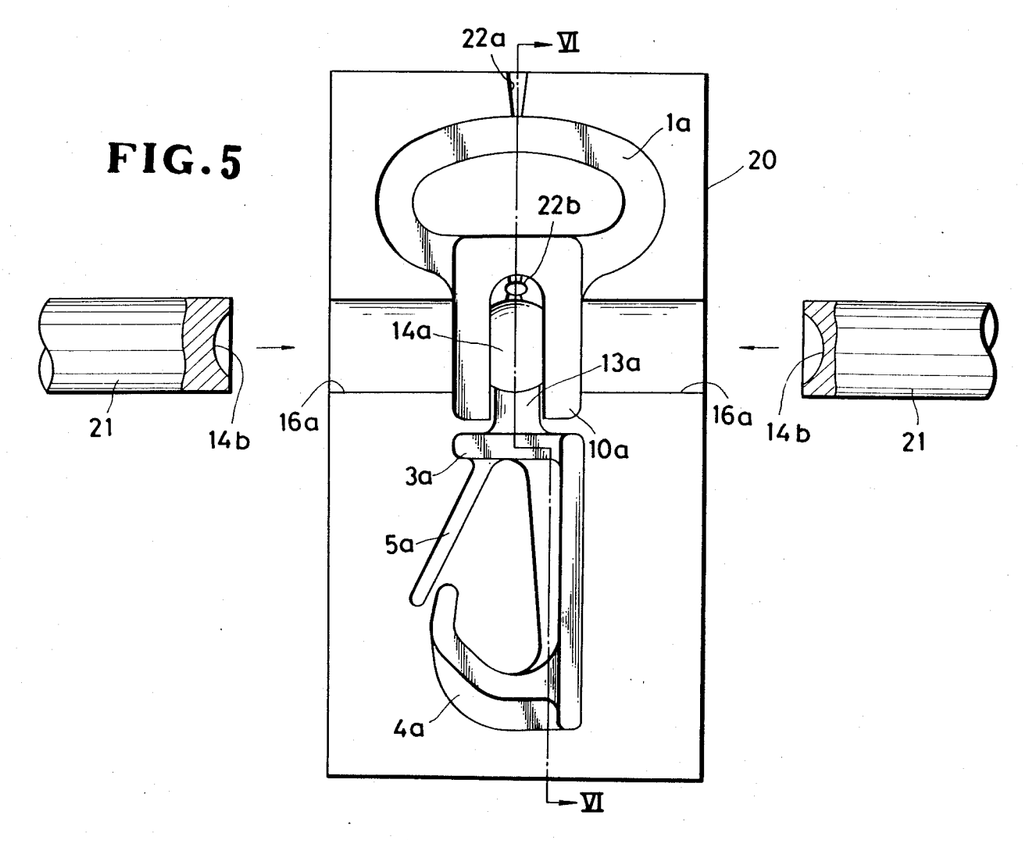
FIG. 5 is an exploded front elevational view, with parts broken away, of a mold for molding the hook of FIGS. 1-4.
Figure 6:
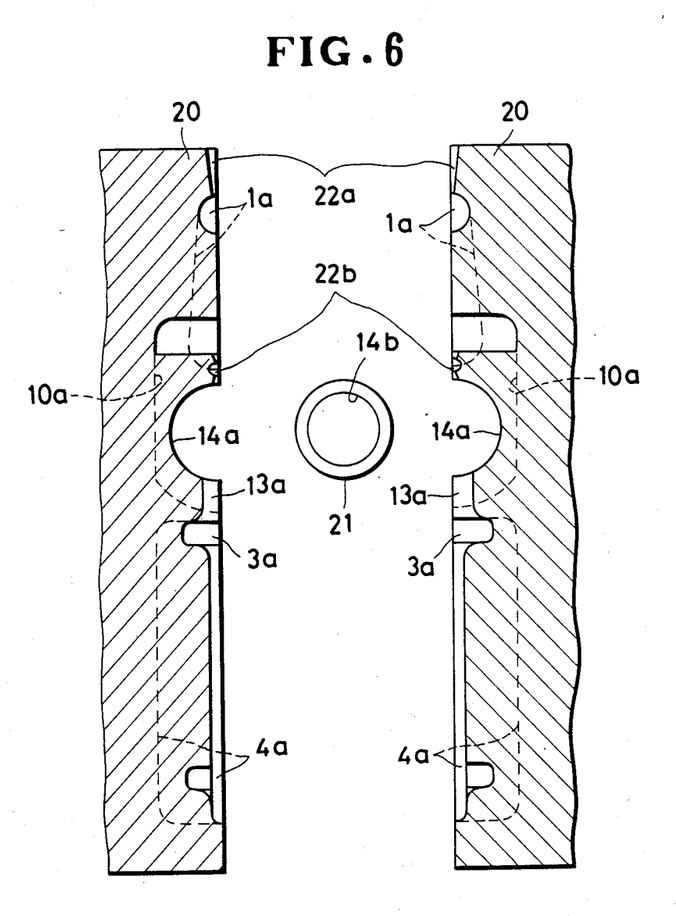
FIG. 6 is a cross-sectional view taken along line VI—VI of FIG. 5.

In production, the eye member 1 and the hook member 2 are molded on a mold simultaneously in a single molding step in coupled or assembled state. As shown in FIGS., 5 and 6, the mold includes a pair of complemental molding die halves 20, 20, and a pair of identical associated cylindrical rods or slides 21, 21. The two molding die halves 20, 20 and the two cylindrical rods 21, 21, when the mold is closed, jointly define a mold cavity having a contour corresponding to the shape of the eye and hook members 1, 2 in coupled state.

The two molding die halves 20, 20 have a pair of symmetrical first recesses 1a, 1a for forming the eye member 1 of a prospective swivel snap hook, a pair of symmetrical second recesses 10a, 10a for forming the bearing portion, a pair of symmetrical third recesses 3a, 3a for forming the base 3 of the hook member 2, a pair of symmetrical fourth recesses 4a, 4a for forming the hook body 4, a pair of symmetrical fifth recesses 5a, 5a for forming the closure tongue 5, and a pair of symmetrical sixth recesses 13a, 13a for forming the arm portion 13. The pair of first recesses 1a, 1a is connected with the pair of fourth recesses 4a, 4a by a runner 22b. As shown in FIG. 6, in each molding die half 20, the fifth recess 5a for the closure tongue 5 extends from the third recess 3a for the base portion 3 at an angle (to the fourth recess 4a for the hook body 4) larger than the angle between the closure tongue 5 and the hook body 4 in coupled or assembled state (FIGS. 1 and 4) in such a manner that a free end of the fifth recess 5a is disposed outwardly of a free end of the fourth recess 4a with a relatively small gap therebetween, for a purpose described below.

The molding die halves 20, 20 also have a pair of symmetrical seventh recesses 14a, 14a for forming a central part of the spherical enlarged end 14 which part is in the shape of a remainder of a sphere in which a pair of diametrically opposed segmental parts has been cut off by a pair of parallel planes. For forming each of the remaining (segmental) parts of the spherical enlarged end 14, each cylindrical rod 21 has in its one end an eighth recess 14b.

Additionally, the two molding die halves 20, 20 have two pairs of ninth recesses 16a, 16a; 16a, 16a, each having a semi-cylindrical contour. Two of the semi-cylindrical ninth recesses 16a, 16a in one molding die half 20 are longitudinally aligned with each other and are disposed in mirror image relation to the other two semi-cylindrical ninth recesses 16a, 16a, respectively, in the other molding die half 20 when the mold is closed for molding. Each symmetrical pair of the semi-cylindrical ninth recesses 16a, 16a extends perpendicularly to the second recesses 10a, 10a and jointly serves to receive a respective one of the cylindrical rods 21.

Figure 1:
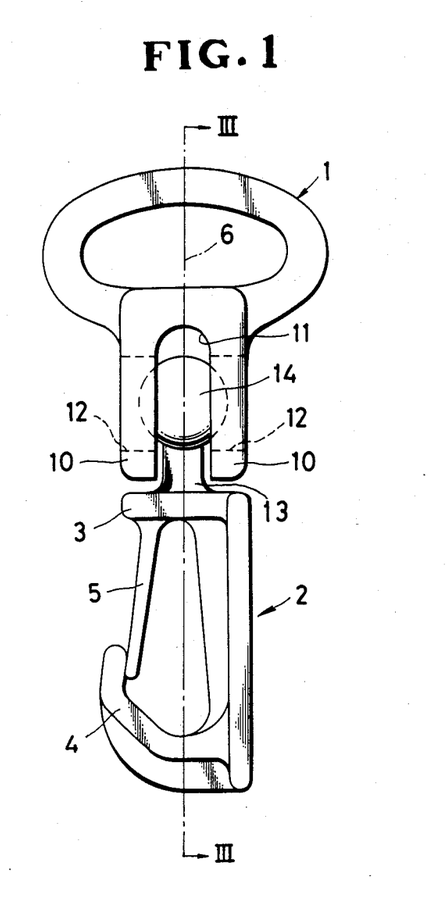
FIG. 1 is a front elevational view of a swivel snap hook of synthetic resin embodying the present invention.
Figure 2:
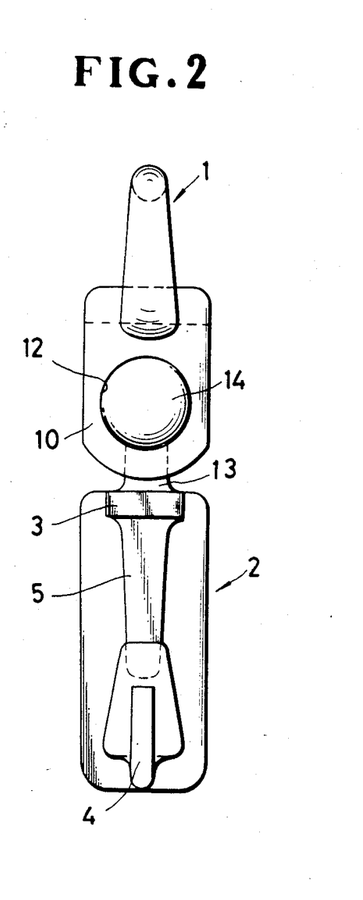
FIG. 2 is a side elevational view of FIG. 1.
Figure 3:
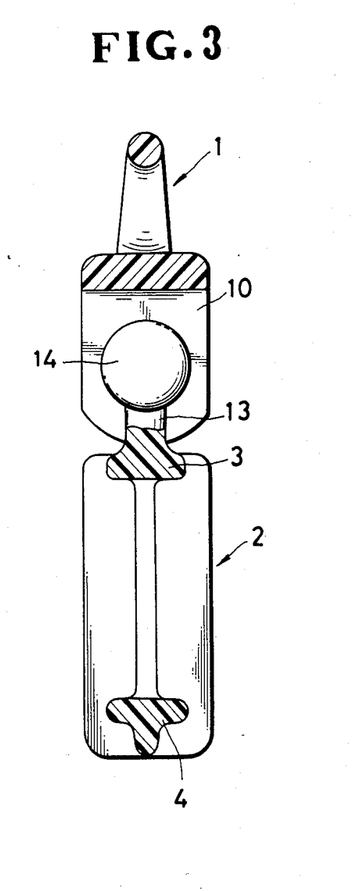
FIG. 3 is a cross-sectional view taken along line III—III of FIG. 1, partly not in cross section.
Figure 4:
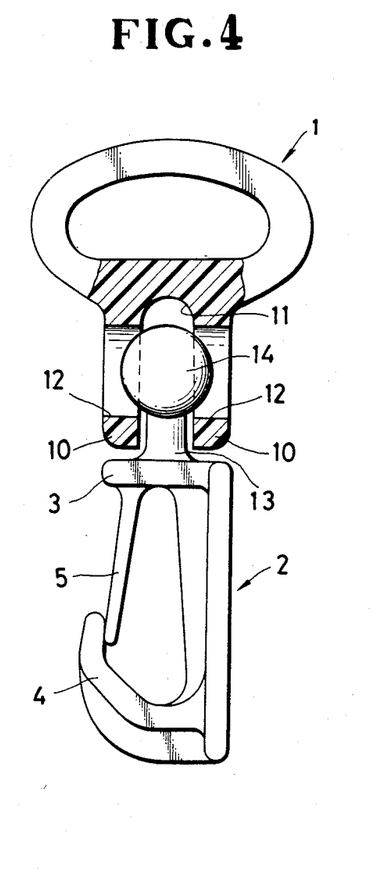
FIG. 4 is a front elevational view similar to FIG. 1, with parts broken away.

In molding, the mold is closed, that is, the two molding die halves 20, 20 are put together in such a manner that each of the first, second, third, fourth, fifth, sixth, seventh and ninth recesses 1a, 3a, 4a, 5a, 10a, 13a, 14a, 16a in one molding die half 20 is in registry with a corresponding one of the recesses in the other molding die 20. Each cylindrical rod 21 is inserted through a corresponding one pair of the opposed semi-cylindrical recesses 16a, 16a perpendicularly to the second recesses 10a, 10a for a bearing portion until the recessed or inner end of the cylindrical rod 21 reaches the seventh recesses 14a, 14a, at which time there is a gap between a peripheral surface of the cylindrical rod 21 and bottom surfaces of the second recesses 10a, 10a. An amount of heat-softened thermoplastic synthetic resin is then injected through a sprue 22a into the closed mold to fill the mold cavity thereof. After the thermoplastic material filled in the mold cavity is could to become hard, the molded article (a prospective swivel snap hook) is removed from the mold by parting the molding die halves 20, 20 and the associated cylindrical rods 21, 21 as is well known in the art. The sprue and runner of the molded article are removed. As a result, the eye member 1 and the hook member 2 have been simultaneously molded in coupled or assembled state. At that time, a free end of the closure tongue 5 is disposed outwardly of a free end of the hook body 4 with a relatively small gap therebetween. Finally, the closure tongue 5 is depressed inwardly of the hook body 4 against the resilience of the closure tongue 5 to bring its free end into engagement with the free end of the hook body 4 on an inner side thereof, as shown in FIGS. 1, 2 and 4, thus normally closing the hook body 4.

Also, the hook member 2 is rotatable on the eye member 1 about the axis of the arm portion 13 and is pivotably movable on the eye member 1 about the spherical enlarged end 14 in a plane which includes the axis 6 of the bearing portion and which is parallel to the bearing halves 10, 10. In use, as the closure tongue 5 is depressed inwardly against its resilience by an article (not shown) to be hooked, the free end of the tongue 5 is spaced apart from the free end of the hook body 4 to open the latter so that the article is allowed to be threaded onto the hook body 4. When the depressing force is released, the closure tongue 5 restores the shape of FIGS. 1 and 4 under its resilience to close the hook body 4, thus preventing the article from being removed from the hook body 4.

Accordingly, it is possible to mold the eye and hook members 1, 2 concurrently in only one molding step in coupled or assembled state, requiring no separate step or steps of assembling the (separately molded) eye and hook members together. The overall process for manufacturing this swivel snap hook is quite simplified and hence much less costly.

Figure 5A:
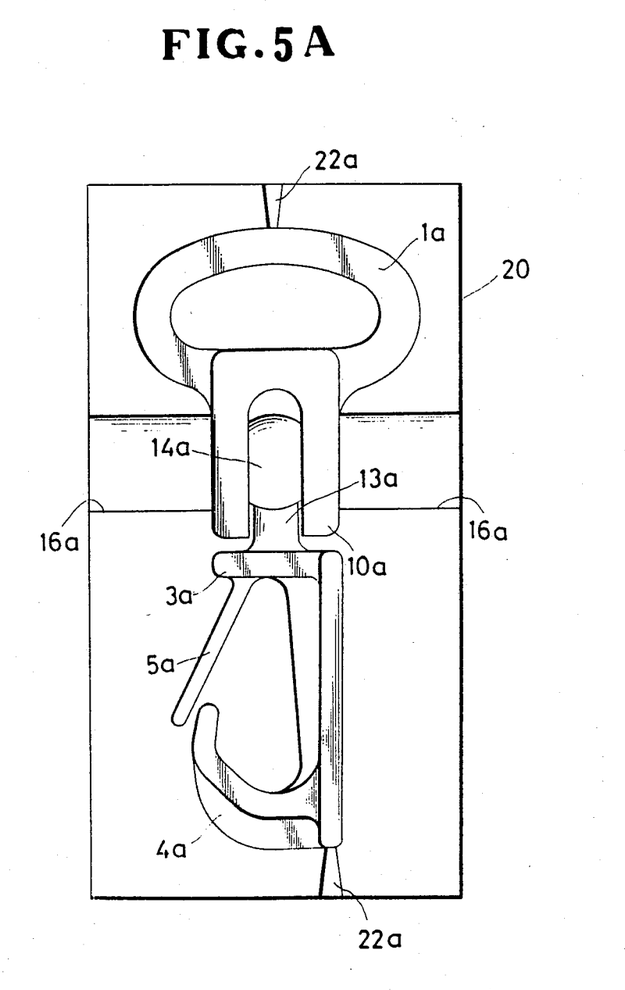
FIG. 5A is a front elevational view of a half of a modified molding die.

FIG. 5A shows a modified form of the mold, in which there are an upper sprue 22a leading to the first recesses 1a, and a lower sprue 22a leading to the fourth recesses 4a. In molding, heat-softened synthetic resin is injected into the mold through the upper and lower sprues 22a, 22a concurrently and separately to fill the mold cavity (the recesses 1a, 13a) for the eye member 1 and to fill the mold cavity (the recesses 4a, 3a, 5a, 13a, 14a, 14b) for the hook member 2. Accordingly the runner 22b (FIGS. 5 and 6) extending between the first recess 1a and the seventh recess 14a may be omitted. In an alternative form, the mold may have only a single central sprue leading to the runner 22b which extends between the first recess 1a and the seventh recess 14a.

Figure 7:
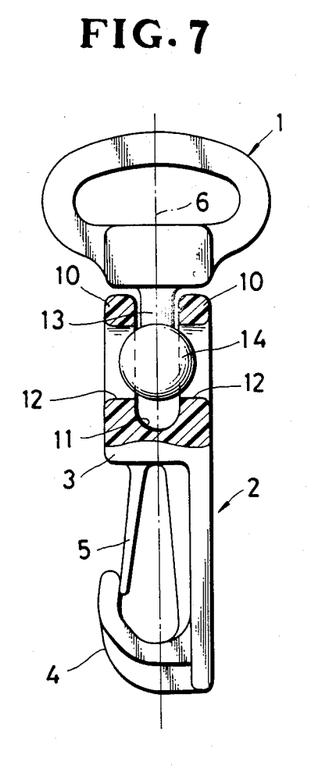
FIG. 7 is a front elevational view similar to FIG. 4, showing a modified swivel snap hook according to a second embodiment.
Figure 8:
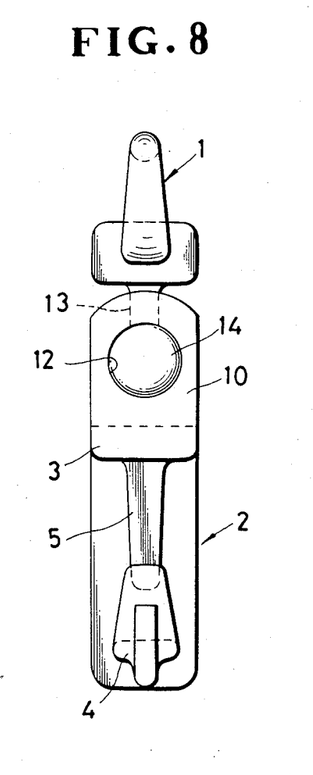
FIG. 8 is a side elevational view of FIG. 7.

FIGS. 7 and 8 illustrate a swivel snap hook according to a second embodiment, in which the bearing halves 10, 10 are an integral part of the hook member 2 and projects from the upper side of the base 3 remotely from the hook body 4 and the closure tongue 5, while the arm portion 13 and thus the spherical enlarged end 14 are an integral part of the eye member 1. In this embodiment, the hook member 2 is rotatable on the spherical enlarged end 14 about the axis of the arm portion 13 and is pivotably movable about the spherical enlarged end 14, thus providing a universal joint between the eye and hook members 1, 2, like the embodiment of FIGS. 1 through 4.

Figure 9:
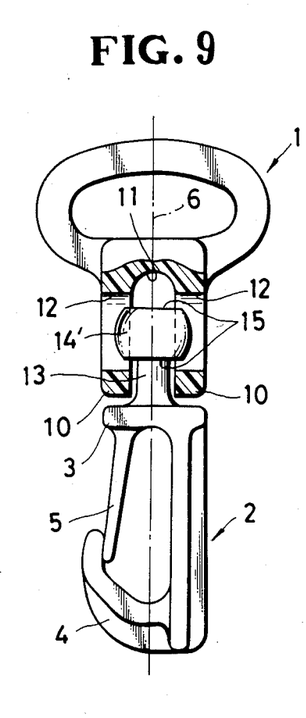
FIG. 9 is a front elevational view, with parts broken away, of a swivel snap hook according to a third embodiment.
Figure 10:
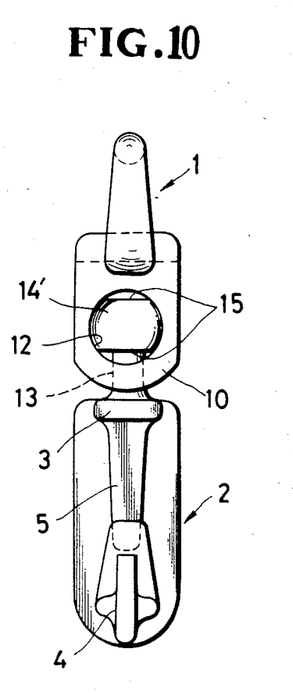
FIG. 10 is a side elevational view of FIG. 9.

According to a third embodiment shown in FIGS. 9 and 10, the enlarged end 14' of the arm portion 13 is in the shape of a remainder of a sphere in which a pair of diametrically opposed segmental parts has been cut off by a pair of parallel planes perpendicular to the axis of the arm portion 13. Thus the enlarged end 14' has upper and lower flat surfaces 15, 15. The eye and hook members 1, 2 are rockable with respect to each other, like the embodiment of FIGS. 1 through 4.

Figure 11:
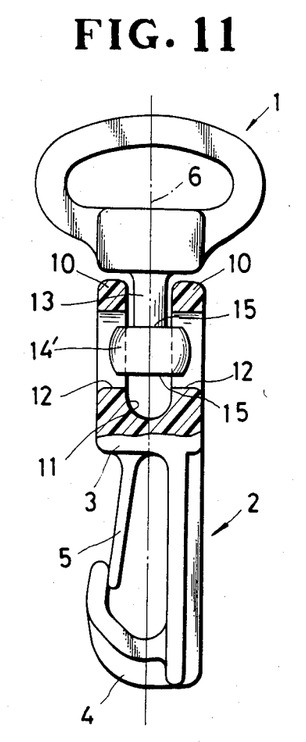
FIG. 11 is a front elevational view similar to FIG. 9, showing a modified swivel snap hook according to a fourth embodiment.
Figure 12:
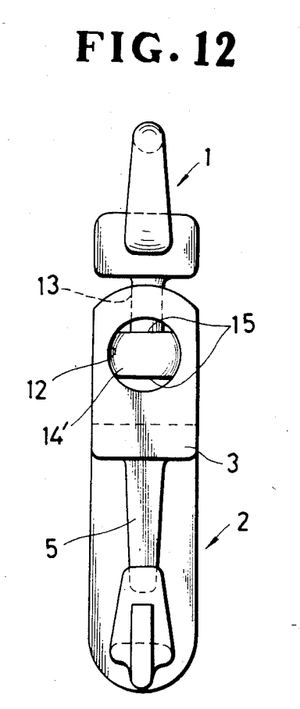
FIG. 12 is a side elevational view of FIG. 11.

FIGS. 11 and 12 illustrate a fourth embodiment which is similar to the third embodiment of FIGS. 9 and 10, except that the bearing halves 10, 10 are an integral part of the hook member 2 and projects from the upper side of the base 3 remotely from the hook boby 4 and the closure tongue 5, while the arm portion 13 and thus the enlarged end 14' are an integral part of the eye member 1. With this arrangement, a universal joint between the eye and hook members 1, 2 can also be achieved, like the first embodiment of FIGS. 1 through 4 and the second embodiment of FIGS. 7 and 8.

Figure 13:
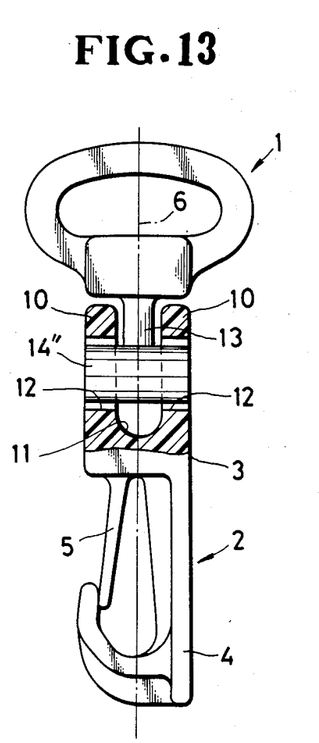
FIG. 13 is a front elevational view, with parts broken away, of a swivel snap hook according to a fifth embodiment.
Figure 14:
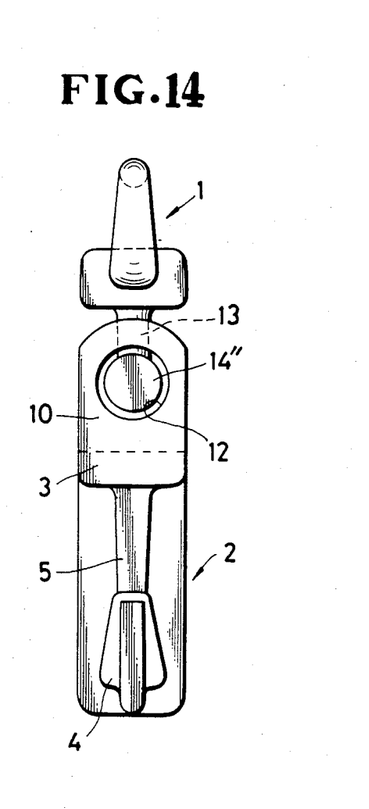
FIG. 14 is a side elevational view of FIG. 13.

According to a fifth embodiment shown in FIGS. 13 and 14, in which the enlarged end 14" of the arm portion 13 is in the shape of a cylinder extending through the pair of aligned through-holes 12, 12 in the bearing halves 10, 10 across the space 11. As the cylindrical enlarged end 14" is rotatably received in the through-holes 12, 12, the hook member 2 is pivotally movable on the eye member 1 about the cylindrical enlarged end 14" in a plane which includes the axis 6 of the arm portion 13 and which is parallel to the bearing halves 10, 10.

Figure 15:
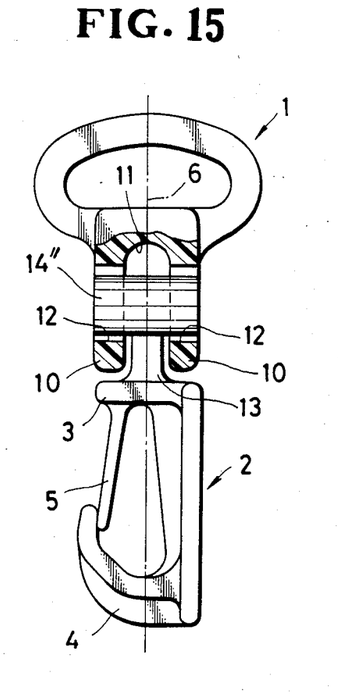
FIG. 15 is a front elevational view similar to FIG. 13, showing a modified swivel snap hook according to a sixth embodiment.
Figure 16:
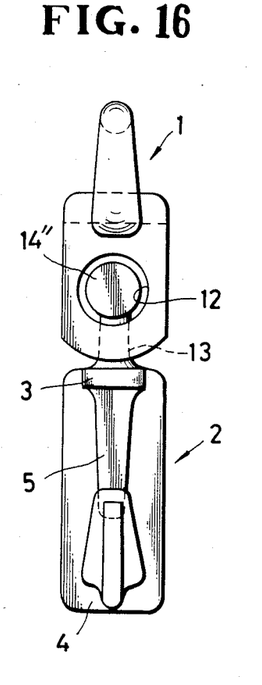
FIG. 16 is a side elevational view of FIG. 15.

FIGS. 15 and 16 illustrate a sixth embodiment which is similar to the fifth embodiment of FIGS. 13 and 14, except that the cylindrical enlarged end 14" of the arm portion 13 is an integral part of the hook member 2 and extends from the upper side of the base 3 remotely from the hook body 2 and the closure tongue 5, while the bearing halves 10, 10 are an integral part of the eye member 1. The hook body 2 is pivotally movable on the eye member 1 about the cylindrical enlarged end 14" in a plane which includes the axis 6 of the bearing portion and which is parallel to the bearing halves 10, 10.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A method of manufacturing a swivel snap hook of synthetic resin, the hook including an eye member, a hook member, and means connecting the eye and hook member for pivotal movements relative to each other, the hook member having a base, a hook body extending from one side of the base, and a closure tongue extending from the one side of the base, the connecting means including a bearing portion extending from one of the eye and hook members and being divided into a pair of opposed bearing halves by a space, the bearing halves having a pair of aligned through-holes of circular cross section communicating with the space, the connecting means also including an arm portion extending from the other member into the space and terminating in an enlarged end loosely received in the through-holes in the bearing halves across the space, said method comprising the steps of:

(a) providing a mold defining a mold cavity of a contour corresponding to the shape of the eye and hook members in coupled state, said mold including a pair of identical molding die halves, and a pair of identical associated cylindrical rods, and said molding die halves having a pair of symmetrical first recesses for forming the eye member, a pair of symmetrical second recesses for forming the bearing portion, a pair of symmetrical third recesses for forming the base of the hook member, a pair of symmetrical fourth recesses for forming the hook body, a pair of symmetrical fifth recesses for forming the closure tongue, a pair of symmetrical sixth recesses for forming the arm portion, and a pair of symmetrical seventh recesses for forming a central part of the enlarged end, each of said cylindrical rods having in its one end an eighth recess for forming a respective one of a pair of opposite remaining parts of the enlarged end, said molding die halves further having two pairs of ninth recesses each having a semi-cylindrical contour, two of said semicylindrical ninth recesses in one molding die half being longitudinally aligned with each other and being disposed in mirror image relation to the other two semi-cylindrical ninth recesses, respectively, in the other molding die half, each symmetrical pair of said semi-cylindrical ninth recesses lying perpendicularly to said second recesses and jointly defining a cylindrical contour for receiving a respective one of said cylindrical rods;

(b) closing said mold in such a manner that each of said first, second, third, fourth, sixth, seventh, eighth and ninth recesses in said one molding die half is in registry with a respective one of the corresponding recesses in said other molding die half, said closing including inserting each said cylindrical rod inserted through each said symmetrical pair of said semi-cylindrical ninth recesses perpendicularly to said second recesses until said one end of each said cylindrical rod reaches said seventh recesses;

(c) injecting an amount of heat-softened thermoplastic synthetic resin into said closed mold to fill the mold cavity; and (d) after said heat-softened synthetic resin in the mold cavity is cooled to become hard, removing from said mold the eye and hook members molded in coupled state.

2. A mold for manufacturing a swivel snap hook of synthetic resin, the hook including an eye member, a hook member, and means connecting the eye and hook member for pivotal movements relative to each other, the hook member having a base, a hook body extending from one side of the base, and a closure tongue extending from the one side of the base, the connecting means including a bearing portion extending from one of the eye and hook members and being divided into a pair of opposed bearing halves by a space, the bearing halves having a pair of aligned through-holes of circular cross section communicating with the space, the connecting means also including an arm portion extending from the other member into the space and terminating in an enlarged end loosely received in the through-holes in the bearing halves across the space, said mold comprising:

(a) a mold defining a mold cavity of a contour corresponding to the shape of the eye and hook members in coupled state, said mold including a pair of identical molding die halves, and a pair of identical associated cylindrical rods, and said molding die halves having a pair of symmetrical first recesses for forming the eye member, a pair of symmetrical second recesses for forming the bearing portion, a pair of symmetrical third recesses for forming the base of the hook member, a pair of symmetrical fourth recesses for forming the hook body, a pair of symmetrical fifth recesses for forming the closure tongue, a pair of symmetrical sixth recesses for forming the arm portion, and a pair of symmetrical seventh recesses for forming a central part of the enlarged end, each of said cylindrical rods having in its one end an eighth recess for forming a respective one of a pair of opposite remaining parts of the enlarged end, said molding die halves further having two pairs of ninth recesses each having a semi-cylindrical contour, two of said semi-cylindrical ninth recesses in one molding die half being longitudinally aligned with each other and being disposed in mirror image relation to the other two semi-cylindrical ninth recesses, respectively, in the other molding die half, each symmetrical pair of said semi-cylindrical ninth recesses lying perpendicularly to said second recesses and jointly defining a cylindrical contour for receiving a respective one of said cylindrical rods; and (b) said mold when closed having each of said first, second, third, fourth, sixth, seventh, eighth and ninth recesses in said one molding die half in registry with a respective one of the corresponding recesses in said other molding die half, each said cylindrical rod being insertable through each said symmetrical pair of said semi-cylindrical ninth recesses perpendicularly to said second recesses until said one end of each said cylindrical rod reaches said seventh recesses.

3. A swivel snap hook of synthetic resin, comprising:
(a) an eye member molded of synthetic resin;
(b) a hook member molded of synthetic resin having a base, a hook body extending from one side of said base, and a closure tongue extending from said one side of said base so as to normally close said hook body, said closure tongue being resiliently deformable to open said hook body; and
(c) means connecting said eye and hook members for pivotal movements relative to each other, said connecting means including
  (1) a bearing portion molded of synthetic resin as an integral part of said eye member and extending from said eye member, said bearing portion being divided into a pair of opposed bearing halves by a space, said bearing halves having a pair of aligned through-holes of circular cross section communicating with said space, and
  (2) an arm portion molded of synthetic resin as an integral part of said hook member and projecting from an opposite side of said base remotely from said hook body and said closure tongue into said space and terminating in an enlarged end which is loosely received in said through-holes in said bearing halves across said space for rocking movements.

4. A swivel snap hook of synthetic resin, comprising:
(a) an eye member molded of synthetic resin;
(b) a hook member molded of synthetic resin having a base, a hook body extending from one side of said base, and a closure tongue extending from said one side of said base so as to normally close said hook body, said closure tongue being resiliently deformable to open said hook body; and
(c) means connecting said eye and hook members for pivotal movements relative to each other, said connecting means including
  (1) a bearing portion molded of synthetic resin as an integral part of said hook member and extending from said hook member, said bearing portion being divided into a pair of opposed bearing halves by a space, said bearing halves having a pair of aligned through-holes of circular cross section communicating with said space, and
  (2) an arm portion molded of synthetic resin as an integral part of said eye member and projecting from an opposite side of said base remotely from said hook body and said closure tongue into said space and terminating in an enlarged end which is loosely received in said through-holes in said bearing halves across said space for rocking movements.

* * * * *